United States Patent
Ueyama et al.

(10) Patent No.: US 6,918,421 B2
(45) Date of Patent: Jul. 19, 2005

(54) THIN FILM FORMING APPARATUS AND THIN FILM FORMING METHOD

(75) Inventors: Tsutomu Ueyama, Kyoto (JP); Izuru Iseki, Kyoto (JP)

(73) Assignee: Dainippon Screen Mfg. Co., Ltd. (JP)

( * ) Notice: Subject to any disclaimer, the term of this patent is extended or adjusted under 35 U.S.C. 154(b) by 127 days.

(21) Appl. No.: 10/263,513

(22) Filed: Oct. 1, 2002

(65) Prior Publication Data

US 2003/0079829 A1 May 1, 2003

(30) Foreign Application Priority Data

Oct. 31, 2001 (JP) ........................................ 2001-334777

(51) Int. Cl.[7] ........................ B23K 37/00; B32B 31/20; B32B 31/04; H01L 21/28; H01L 21/46
(52) U.S. Cl. .................... 156/580; 156/583.1; 156/381; 156/542; 156/556; 156/584; 438/455; 438/458; 427/96; 427/146
(58) Field of Search ................................ 156/285, 286, 156/230, 238, 358, 359, 366, 381, 387, 510, 527, 580, 583.1, 242, 344, 584, 540, 542, 556; 438/455, 458, 459; 427/146, 147, 148, 96

(56) References Cited

U.S. PATENT DOCUMENTS 6,092,578 A * 7/2000 Machida et al. ............ 156/358

FOREIGN PATENT DOCUMENTS

| JP | 61-231714 | 10/1986 |
| JP | 10-189566 | 7/1998 |
| JP | 11-135761 | 5/1999 |

* cited by examiner

*Primary Examiner*—Jerry A. Lorengo
(74) *Attorney, Agent, or Firm*—Ostrolenk, Faber, Gerb & Soffen, LLP (57) ABSTRACT

With a thin film bearing surface of a substrate directed toward an insulation film which is formed on a surface of a quartz plate, the substrate and the quartz plate are moved closer to each other and the insulation film is tightly adhered to the thin film bearing surface (adhering process). The quartz plate alone is then selectively peeled off, thereby completing transfer of the insulation film onto the substrate (peeling process). In this manner, the insulation film is disposed on the thin film bearing surface of the substrate, and a transportation mechanism then houses the substrate in a substrate cassette. Meanwhile, after the quartz plate is transported by the transportation mechanism to a cleaning unit and cleaned by the cleaning unit (cleaning process), the quartz plate is returned to a plate-like member cassette and waits in this cassette until reused next time.

10 Claims, 8 Drawing Sheets

FIG. 1

COATING (S 1) + DRYING (S 2)

FIG. 2A

ADHERING (S 3)

FIG. 2B

PEELING (S 4)

FIG. 2C

CLEANING (S 5)

THIN FILM FORMING APPARATUS AND THIN FILM FORMING METHOD

BACKGROUND OF THE INVENTION

1. Field of the Invention

The present invention relates to a thin film forming apparatus and a thin film forming method with which it is possible to transfer a thin film, such as an insulation film and a metallic film, to a thin film bearing surface of a substrate and accordingly dispose the thin film.

2. Description of the Related Art

Over the recent years, it has became necessary to use a thin film forming method suitably applicable to a large area size as wafers used during manufacturing of LSIs have became larger in diameter, liquid crystal panels have became larger in area size, etc. In addition, in the field of multilevel interconnections techniques among techniques for manufacturing LSIs, as the surface of an insulation film needs be planarized accurately to realize multilevel interconnection. There are increasing demands for larger area sizes and better surface planarization techniques for planarization of surfaces during fabrication of thin films. In an effort to satisfy these demands, thin film forming techniques for forming a thin film on a substrate by a pressure transfer method have been proposed.

Figure 8A:
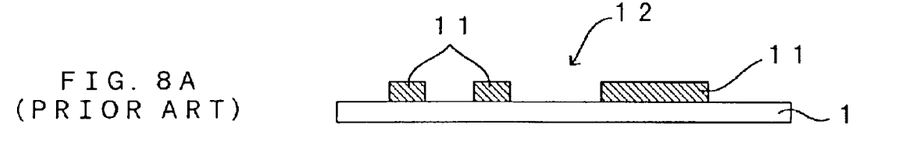
FIGS. 8A through 8D are drawings which show basic operations of a conventional thin film forming apparatus.

This type of thin film forming apparatus may be an apparatus which is described in Japanese Patent Application Laid-Open Gazette No. H10-189566 for instance. In this apparatus, a thin film is disposed on a substrate following thin film forming steps which are shown in FIGS. 8A through 8D. First, as shown in FIG. 8A, a substrate 1, such as a semiconductor wafer and a glass substrate for liquid crystal panel, is placed on a specimen holder in such a manner that electrode interconnections 11 formed on a surface of the substrate 1 direct themselves to above. In this example, the surface 12 seating the electrode interconnections 11 serves as a thin film bearing surface on which a thin film is to be disposed through steps described below.

Figure 8B:
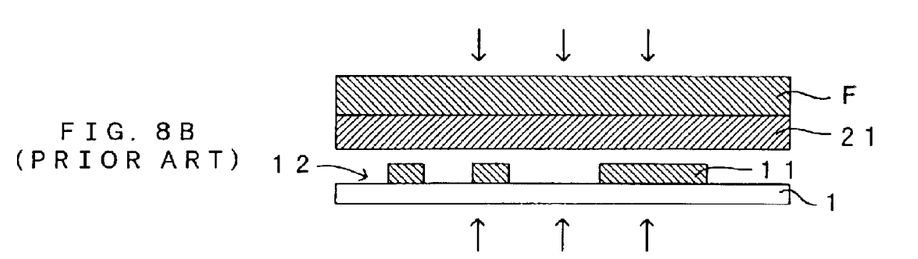

Next, as shown in FIG. 8B, a sheet film F whose surface already seats an insulation film 21 is mounted to a transfer plate which is located above the specimen holder to face the specimen holder. In this example, the insulation film 21 is the thin film which is to be transferred onto the substrate 1. The insulation film 21 is located so as to face the thin film bearing surface 12 of the substrate 1 which is held on the specimen holder. The specimen holder is moved toward the transfer plate and the substrate 1 and the sheet film F are accordingly brought into contact with each other. Thereafter the substrate 1 and the sheet film F are pressed against each other as denoted at the arrows in FIG. 8B for a certain period of time while heating the substrate 1 to a predetermined temperature. As a result, the substrate 1 and the sheet film F tightly adhere to each other with the insulation film 21 inserted between the two, and a tightly adhered object is obtained.

Figure 8C:
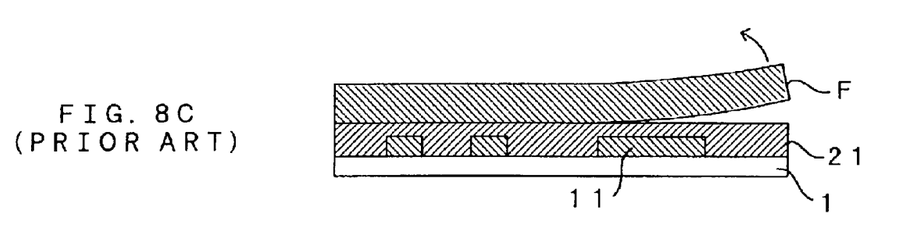
Figure 8D:
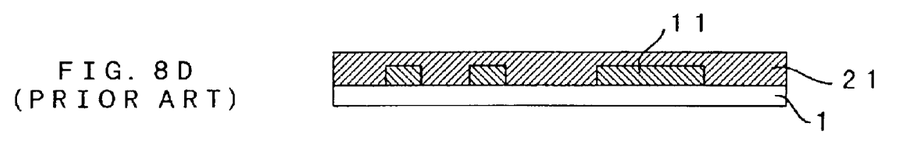

Thus obtained tightly adhered object is taken out from a thin film forming chamber and the sheet film F is peeled off as shown in FIG. 8C, whereby the insulation film 21 is transferred onto the thin film bearing surface 12 of the substrate 1 as shown in FIG. 8D.

By the way, as described above, in a conventional thin film forming apparatus, the insulation film (thin film) 21 is formed on the sheet film F which is flexible in advance. The insulation film 21 is transferred onto the substrate 1 as the sheet film F is peeled off after joining the insulation film 21 to the thin film bearing surface 12 of the substrate 1. Hence, once the sheet film F is used, this sheet film F can not be used again. The sheet film F is thus treated as disposable goods so to speak. The sheet films F after transfer of thin films are waste and one of causes to increase a running cost.

Further, once human operators handle transportation of the sheet films F, particles may adhere to the sheet films F or heat may dissipate from the sheet films F. This makes it difficult to control heat histories and leads to a deterioration in product quality of thin films and even a drop in production yield, which is a problem. There is another problem that a large floor space is necessary to install the apparatus. While automated transportation of the sheet films is indispensable to solve these problems, since the sheet films F are flexible, there is one of major obstacles to automation as transportation of the sheet films F using a known transportation mechanism such as a transportation robot is difficult.

SUMMARY OF THE INVENTION

A major object of the present invention is to provide a thin film forming apparatus and a thin film forming method which make it possible to dispose a thin film on a substrate at a low running cost.

Another object of the present invention is to provide a thin film forming apparatus and a thin film forming method which are easily compatible with automation.

Infullment of the foregoing object, a thin film forming apparatus and a thin film forming method are particularly well suited to transferring a thin film to a substrate. A thin film is formed on a surface of a non-flexible plate-like member. A thin film bearing surface of the substrate faces against the thin film which is formed on the surface of the plate-like member. At least one of the plate-like member and the substrate moves closer toward the other, whereby the thin film is tightly adhered to the thin film bearing surface. Following this, the joining of the thin film and the plate-like member is released to peeling off the plate-like member. Hence, the thin film is transferred onto the substrate from the plate-like member, and the thin film is disposed on the thin film bearing surface of the substrate.

The above and further objects and novel features of the invention will more fully appear from the following detailed description when the same is read in connection with the accompanying drawing. It is to be expressly understood, however, that the drawing is for purpose of illustration only and is not intended as a definition of the limits of the invention.

DETAILED DESCRIPTION OF THE PREFERRED EMBODIMENTS

Before describing detailed structures and operations of processing units (coating unit, drying unit, adhering unit, peeling unit and cleaning unit) which form a thin film forming apparatus, operations of the thin film forming apparatus will now be outlined with reference to FIGS. 1, 2A through 2D.

Figure 1:
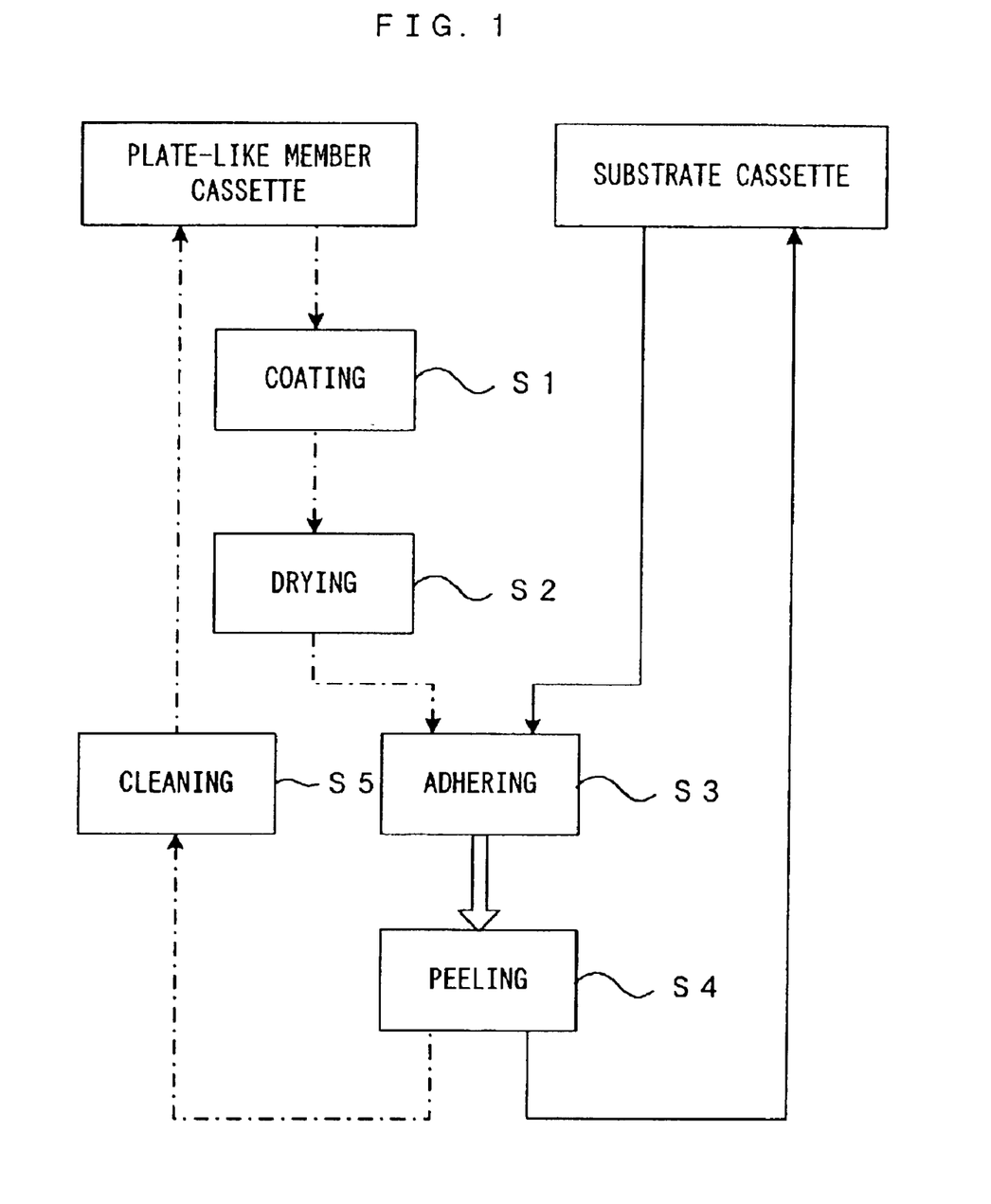
FIG. 1 is a drawing which shows basic operations of a thin film forming apparatus according to the present invention.
Figure 2A:
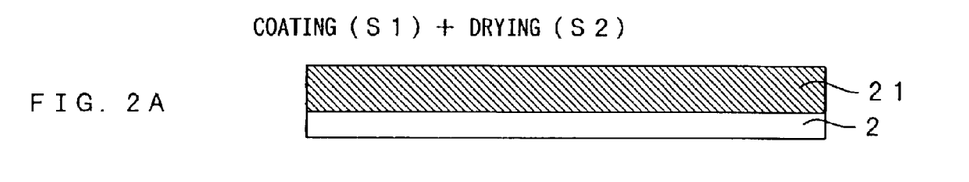
FIGS. 2A through 2D are schematic diagrams which show the basic operations in FIG. 1.

FIG. 1 is a drawing which shows basic operations of a thin film forming apparatus according to the present invention. In FIG. 1, solid arrows denote the order in which a substrate is transported, dotted arrows denote the order in which a quartz plate is transported, and a thick white arrow denotes the order in which a tightly adhered object is transported. FIGS. 2A through 2D are schematic diagrams which show the basic operations in FIG. 1. In this thin film forming apparatus, the substrate whose surface seats the electrode interconnections 11 is housed in a substrate cassette, while the quartz plate 2 which corresponds to the "non-flexible plate-like member" of the present invention is housed in a plate-like member cassette. The quartz plate 2 is unloaded from the plate-like member cassette with a conventional transportation mechanism such as a transportation robot, and as shown in FIG. 2A, after coating a surface of the quartz plate 2 with the insulation film 21 (Step S1: COATING), the insulation film 21 is dried (Step S2: DRYING).

Figure 2B:
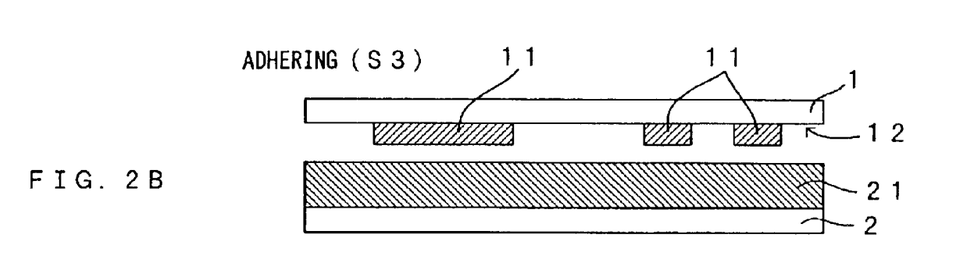

While the quartz plate 2 whose surface now seats the insulation film 21 is transported to an adhering unit, the substrate 1 is unloaded from the substrate cassette. The unloaded substrate 1 is positioned such that the thin film bearing surface of the substrate 1, namely, the surface 12 on which the electrode interconnections 11 are formed faces the insulation film 21 which is formed on the quartz plate 2 (FIG. 2B). The insulation film 21 is tightly adhered to the thin film bearing surface 12 as the substrate 1 and the quartz plate 2 are moved closer to each other while maintaining this opposed arrangement, whereby a tightly adhered object (denoted at the reference symbol A in FIG. 6 which will be described later) is obtained (Step S3: ADHERING). The tightly adhered object is integration of the substrate 1 and the quartz plate 2 with the insulation film 21 inserted between the two.

Figure 2C:
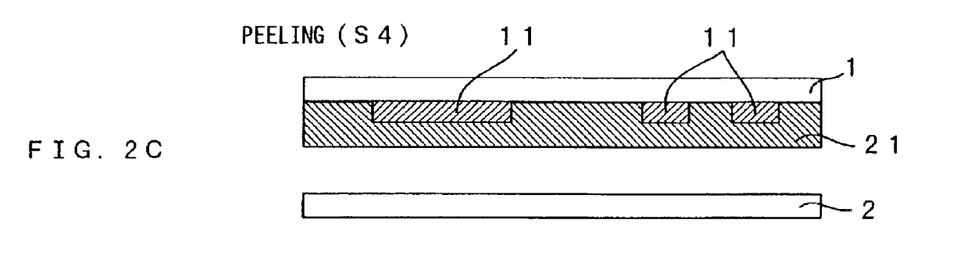
Figure 2D:
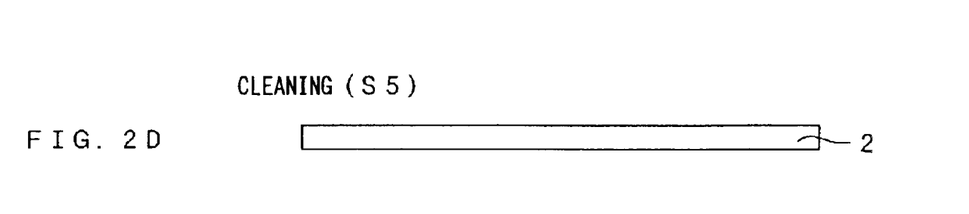

Next, after transporting the tightly adhered object to a peeling unit, as shown in FIG. 2C, only the quartz plate 2 is selectively peeled off from the tightly adhered object, which completes transfer of the insulation film 21 onto the substrate 1 (Step S4: PEELING). In this manner, the insulation film 21 is disposed on the thin film bearing surface 12 of the substrate 1 and the substrate 1 with the insulation film 21 is then housed by the transportation mechanism into the substrate cassette. Meanwhile, the quartz plate 2, after transported by the transportation mechanism to a cleaning unit and cleaned (Step S5: CLEANING) as shown in FIG. 2D, is returned to the plate-like member cassette and waits within the cassette until reused next time.

A description will now be given on structures and operations of the coating unit, the drying unit, the adhering unit, the peeling unit and the cleaning unit which form the thin film forming apparatus according to the present invention and respectively execute the coating process, the drying process, the adhering process, the peeling process and the cleaning process described above.

Figure 3:
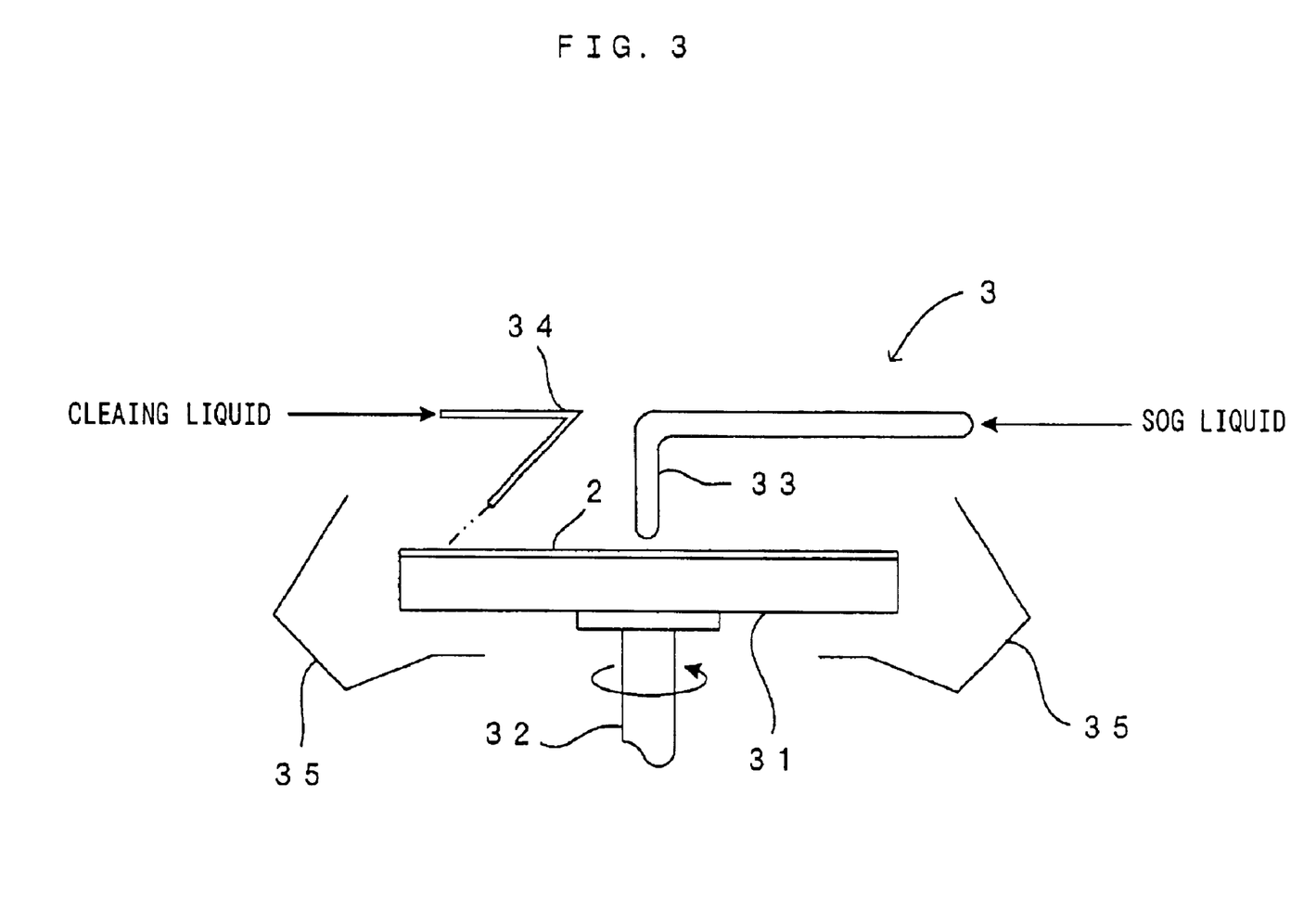
FIG. 3 is a drawing of a preferred embodiment of a coating unit which is disposed in the thin film forming apparatus according to the present invention.

FIG. 3 is a drawing of a preferred embodiment of the coating unit which is disposed in the thin film forming apparatus according to the present invention. The coating unit 3 comprises a disk-shaped stage 31, a rotation shaft 32 of a motor (not shown) which rotates the stage 31, an SOG liquid discharge nozzle 33 for discharging a coating liquid such as an SOG (Spin-on-Glass) liquid, a cleaning liquid discharge nozzle 34 for discharging a cleaning liquid upon a peripheral edge portion of the quartz plate 2 to thereby perform edge rinse, and a splash prevention cup 35 which prevents the coating liquid, the cleaning liquid and the like from splashing around the coating unit 3.

A plurality of support pins not shown are disposed to the stage 31 in such a manner that the support pins slide upward and downward. After the support pins protrude upward beyond a top surface of the stage 31 and receive the quartz plate 2 from the transportation mechanism, the support pins sink downward inside the stage 31, thereby placing the quartz plate 2 on the top surface of the stage 31. In addition, there are a plurality of suction holes formed in the stage 31, and therefore, it is possible to vacuum-suck and hold thus placed quartz plate 2. Further, as the support pins move upward, the quartz plate 2 on the stage 31 is lifted up from the stage 31, so that the transportation mechanism can transport the quartz plate 2 out from the coating unit 3. The splash prevention cup 35 sits around the stage 31 which has such a structure.

Operations of the coating unit 3 having such a structure will now be described. In this apparatus, as the transportation mechanism and the support pins place the quartz plate 2 unloaded from the plate-like member cassette on the stage 31, the quartz plate 2 is vacuum-sucked and supported to the stage 31, which completes setting of the quartz plate 2 to the coating unit 3. A motor (not shown) attached to the coating unit 3 operates and the rotation shaft 32 starts rotating, and in accordance with the rotations, the stage 31 and the quartz plate 2 rotate. At the same time with or slightly in delay from the rotations, the SOG liquid is supplied from the SOG liquid discharge nozzle 33 toward a central point of the quartz plate 2. In response, due to the centrifugal force attributed to the rotations of the quartz plate 2, the SOG liquid is applied from the center of the quartz plate 2 to the entire surface of the quartz plate 2 and the insulation film (SOG film) 21 is accordingly formed. At this stage, the SOG liquid splashed outside the quartz plate 2 is discharged to outside the coating unit 3 through the splash prevention cup 35, and further, a discharge pipe not shown.

After the SOG liquid is supplied to the entire surface of the quartz plate 2, edge rinse is carried out. In short, the cleaning liquid is discharged toward the peripheral edge portion of the quartz plate 2 from the cleaning liquid discharge nozzle 34. At this stage as well, since the quartz plate 2 keeps rotating, the coating liquid adhering to the peripheral edge portion of the quartz plate 2 is removed owing to the rotations. As coating (Step S1) for the quartz plate 2 completes in this manner, after vacuum suction is released, the support pins lift up the quartz plate 2 from the stage 31 and the transportation mechanism transports the quartz plate 2 to the drying unit 4 which is the next unit.

Although the coating unit 3 uses the SOG liquid as the coating liquid in this embodiment, the coating liquid is not particularly limited to this but may be any coating liquid, such as a photoresist liquid used for photolithographic processing of a semiconductor device and an SOD (Spinon-Dielectric) liquid, which creates a thin film which is to be disposed on the substrate 1. In addition, although the preferred embodiment above requires to vacuum-suck and hold the quartz plate 2, the quartz plate 2 may be held mechanically. It is needless to mention that a method of holding the quartz plate 2 is not limited to any particular method, and this similarly applies to other processing units as well.

Figure 4:
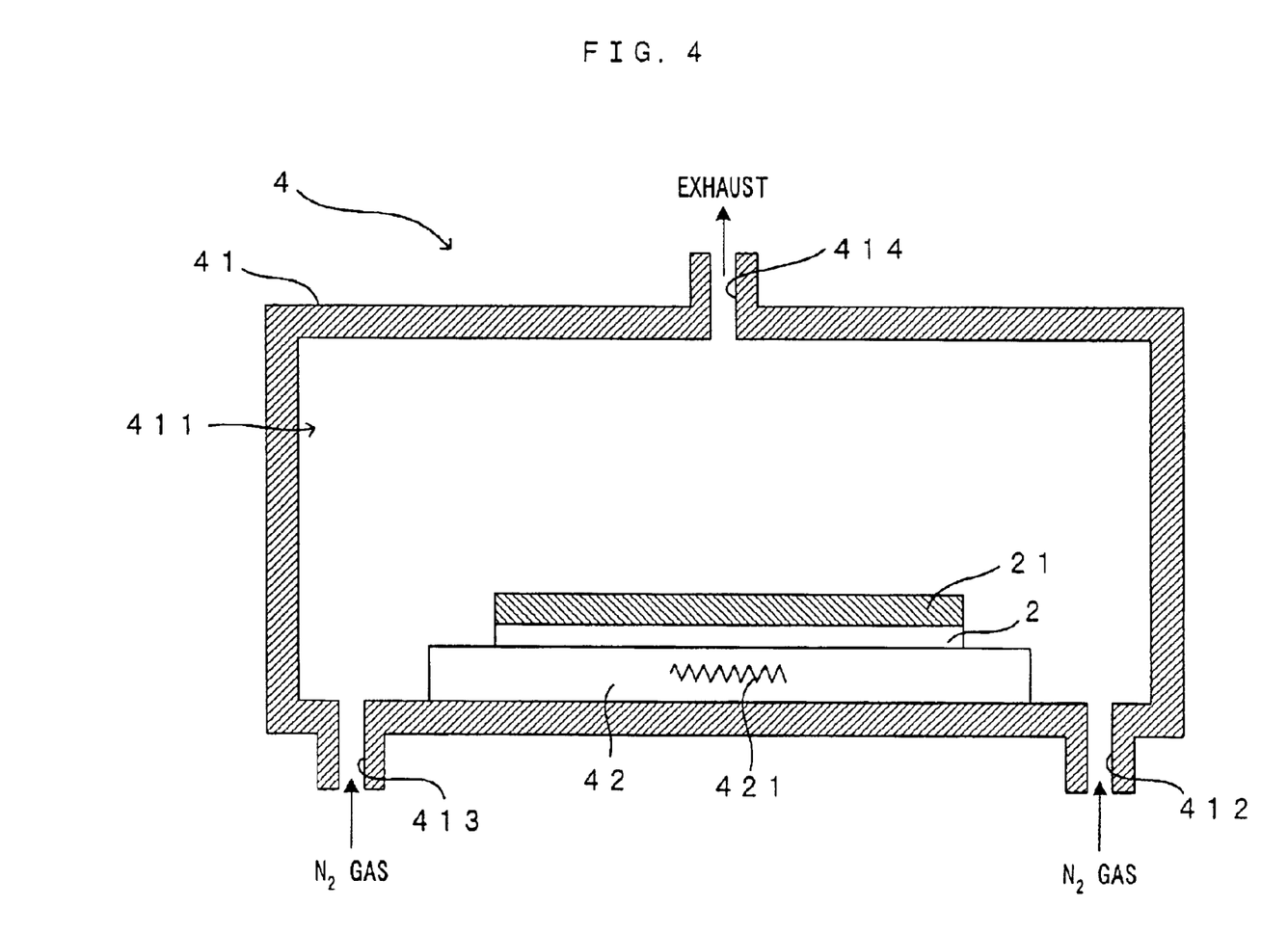
FIG. 4 is a drawing of a preferred embodiment of a drying unit which is disposed in the thin film forming apparatus according to the present invention.

FIG. 4 is a drawing of a preferred embodiment of the drying unit which is disposed in the thin film forming apparatus according to the present invention. The drying unit 4 comprises a processing container 41 whose inside serves as a processing chamber 411 for executing the drying process (Step S2), and a hot plate (stage) 42 which is attached to an inner bottom portion of the processing chamber 411.

Two nitrogen inlets 412 and 413 are formed in a bottom portion of the processing container 41, and nitrogen gas ($N_2$ gas) is supplied from a nitrogen gas supplier not shown into the processing chamber 411 via the inlets 412 and 413. An exhaust vent 414 is formed in a ceiling portion of the processing container 41 so that it is possible to discharge a gas component in the processing chamber 411 out from the processing chamber 411. Owing to this, the processing chamber 411 is filled with a nitrogen gas atmosphere, and the drying process is performed in this atmosphere.

The hot plate 42 internally comprises a heater 421, and the heater 421 develops heat in response to an electric signal which is fed from a control unit (not shown). Like the stage 31 of the coating unit 3, support pins (not shown) which can slide upward and downward are disposed to the hot plate 42, and therefore, the support pins and the transportation mechanism can load the quartz plate 2 on the hot plate 42 and unload the quartz plate 2 from the hot plate 42. As soon as the transportation mechanism and the support pins place the quartz plate 2 on the hot plate 42, the drying process (Step S2) is initiated.

Although the quartz plate 2 which is an object to be dried is placed directly on the hot plate 42 in the preferred embodiment, so-called proximity drying may be performed according to which the quartz plate 2 is dried in a very small distance away from the hot plate 42.

Further, for the purpose of easily transferring the insulation film 21 from the quartz plate 2 onto the substrate 1, it is preferable that at the stage of transfer of the insulation film (SOG film) 21 seated on the quartz plate 2 onto the substrate 1 in the adhering unit 5 which will be described next, the drying process finishes when the insulation film 21 is half dried.

Figure 5:
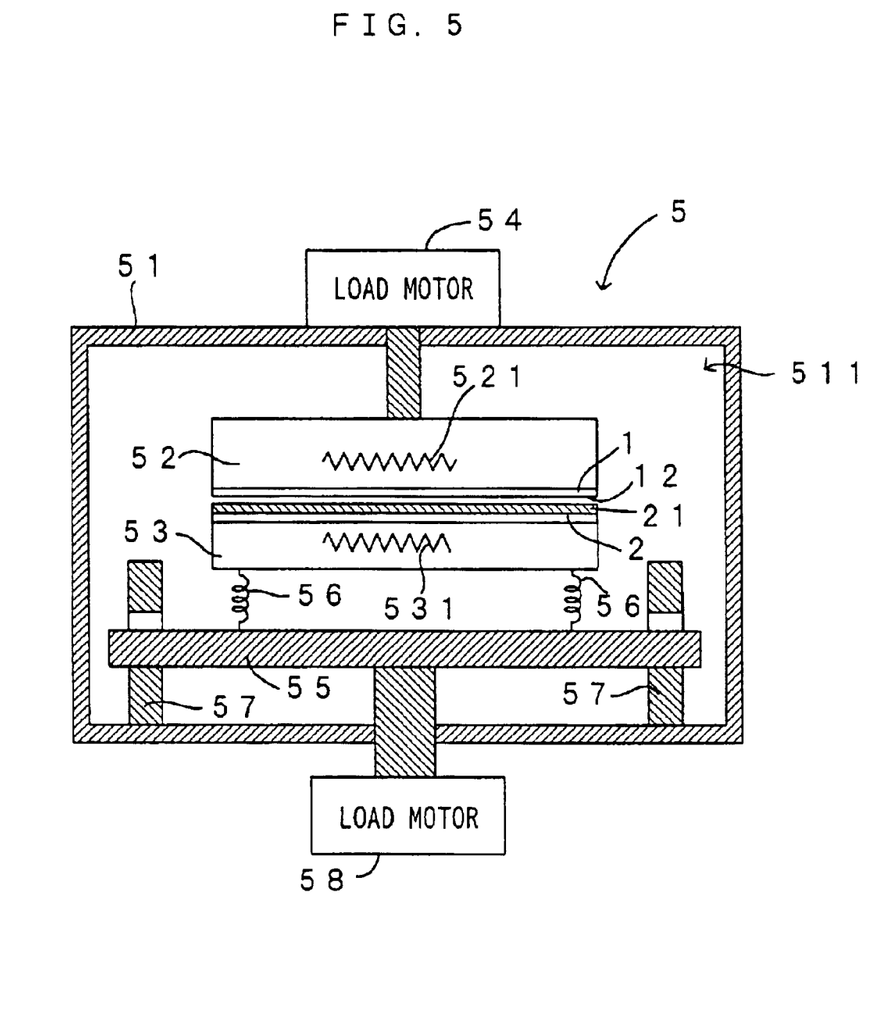
FIG. 5 is a drawing of a preferred embodiment of an adhering unit which is disposed in the thin film forming apparatus according to the present invention.

FIG. 5 is a drawing of a preferred embodiment of the adhering unit which is disposed in the thin film forming apparatus according to the present invention. The adhering unit 5 comprises a processing container 51 whose inside serves as a processing chamber 511 for executing the adhering process (Step S5). A first and a second stages 52 and 53 are housed in the processing chamber 511 in such a manner that the first and the second stages 52 and 53 are opposed with each other one over the other. Of these stages, the first stage 52 has a stage surface which faces the second stage 53. On the stage surface the first stage 52 is capable of holding the substrate 1 unloaded from the substrate cassette such that the thin film bearing surface 12 of the substrate 1 is directed to below.

In addition, a heater 521 is disposed within the first stage 52. The heater 521 is controlled based on a substrate temperature signal fed from the control unit (not shown) to a temperature between 25° C. and 300° C. for instance. The first stage 52 is hung inside the processing container 51 and raised and lowered by a load motor 54.

The other one of the stages, namely, the second stage 53 is arranged below the first stage 52 so that the axis line of the second stage 53 coincides with that of the first stage 52. The second stage 53 has a top surface which faces the thin film bearing surface 12 of the substrate 1. On the top surface the second stage 53 is capable of sucking the quartz plate 2 such that the insulation film 21 is directed to the thin film bearing surface 12 of the substrate 1. The structure of the second stage 53 is approximately the same as that of the stage 31 of the coating unit 3, leaving a difference that a heater 531 is disposed within the stage 53 and the heater 531 is controlled based on a quartz plate temperature signal fed from the control unit (not shown) to a temperature between 25° C. and 300° C. for example.

Further, elastically supported by a plurality of compression coil springs 56 on a support plate 55, the second stage 53 ensures that the loaded pressure of pressing the substrate 1 and the quartz plate 2 is uniform. The support plate 55 is held by a support column 57 for free vertical movement, and raised and lowered by a load motor 58.

In the adhering unit 5 having such a structure described above, the two stages 52 and 53 are moved vertically closer to each other by the load motors 54 and 58 while holding the substrate 1 and the quartz plate 2 with the stages 52 and 53 in such a manner that the thin film bearing surface 12 of the substrate 1 faces the insulation film (thin film) 21 which is formed on the surface of the quartz plate (plate-like member) 2. Hence, the insulation film 21 is tightly adhered to the thin film bearing surface 12 and the tightly adhered object is accordingly obtained which is integration of the substrate 1 and the quartz plate 2 with the insulation film 21 inserted between the two.

Although the preferred embodiment above requires that the stages 52 and 53 are moved toward each other to thereby bring the insulation film 21 on the quartz plate 2 into tight adhesion with the thin film bearing surface 12, the adhesion may be achieved by moving only the stage 52 toward the other (stage 53) or only the stage 53 toward the other (stage 52). The importance in this respect is to merely ensure that at least one of the substrate 1 and the quartz plate 2 is moved toward the other and the insulation film (thin film) 21 accordingly adheres to the thin film bearing surface 12 of the substrate 1.

Figure 6:
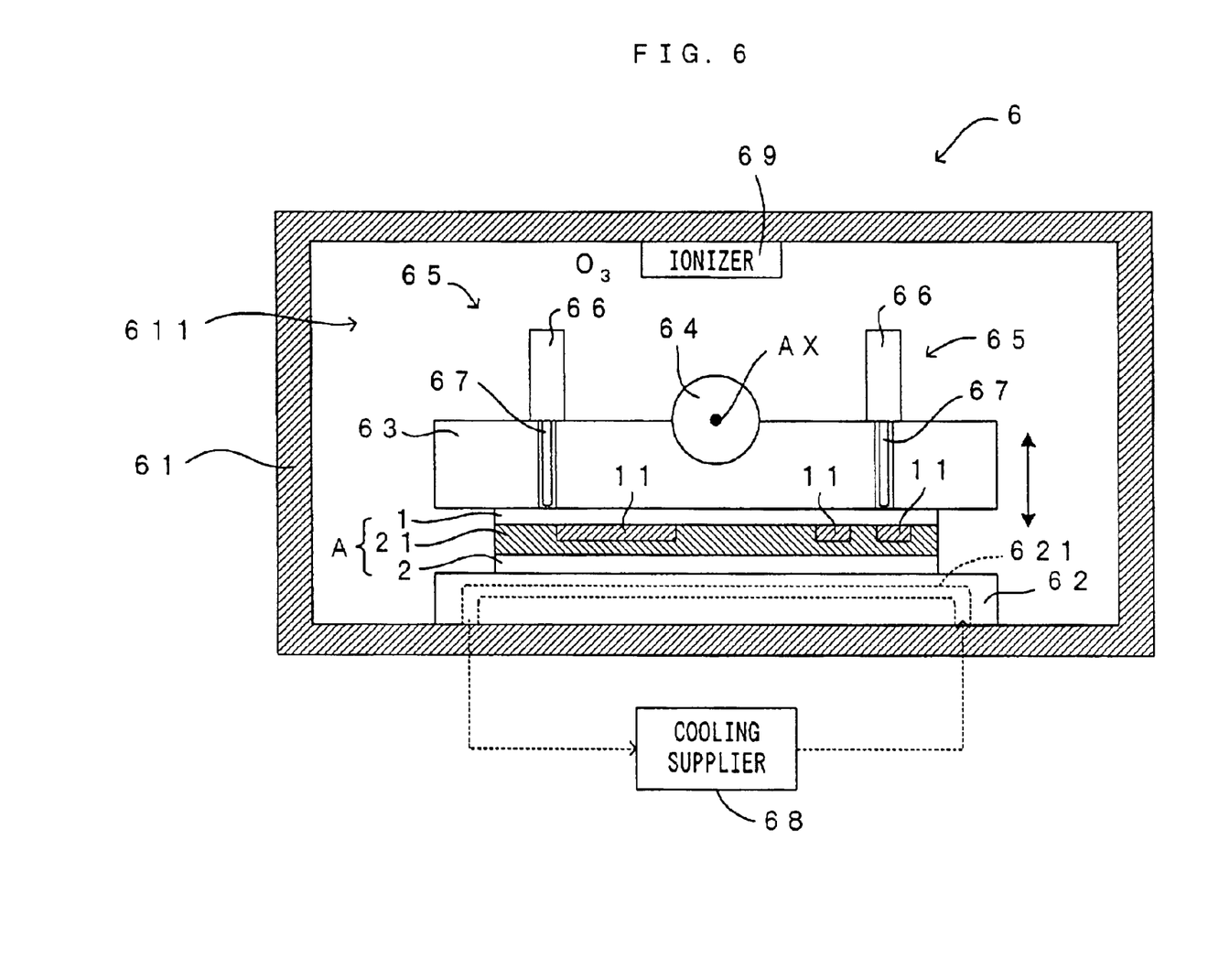
FIG. 6 is a drawing of a preferred embodiment of a peeling unit which is disposed in the thin film forming apparatus according to the present invention.

The transportation mechanism transports thus obtained tightly adhered object to the next processing unit, i.e., the peeling unit 6 and the peeling process (Step S4) is then executed.

FIG. 6 is a drawing of a preferred embodiment of the peeling unit which is disposed in the thin film forming apparatus according to the present invention. The peeling unit 6 comprises a processing container 61 whose inside serves as a processing chamber 611 for executing the peeling process (Step S4), a cool plate 62 which is disposed below the processing chamber 611 and vacuum-sucks the quartz plate 2 of the tightly adhered object A created in the adhering unit 5 described above, and a substrate suction plate 63 which is disposed above the cool plate 62 within the processing chamber 611 and capable of sucking the substrate 1 of the tightly adhered object A placed on the cool plate 62 and revolving in the vertical direction and around an axis AX which is along a direction vertical to the plane of FIG. 6.

A revolving mechanism 64 which uses a rotary air cylinder or the like is connected to the substrate suction plate 63, for the purpose of revolving the substrate suction plate 63 around the axis AX. Meanwhile, a vertical movement mechanism 65 is disposed to the substrate suction plate 63.

The vertical movement mechanism 65 comprises pins 67 which are moved by drive members 66, such as air cylinders, forward and backward relative to the surface of contact of the substrate suction plate 63 with the substrate 1. When the substrate suction plate 63 has revolved thereby directing the substrate 1 toward above, the pins 67 are raised so that the substrate 1 is raised above beyond the substrate suction plate 63.

An ionizer 69 is disposed within the processing chamber 611 of the processing container 61, so that it is possible to develop an ozone ($O_3$) atmosphere inside the processing chamber 611.

Disposed inside the cool plate 62 is a distribution path 621 for distributing a coolant such as cooling water, liquid nitrogen and the like, which makes it possible to forcibly cool the quartz plate 2 which is in direct contact with the cool plate 62 by means of a distributed coolant through the distribution path 621 from a coolant supplier 68. As described above, in this embodiment, the cool plate 62 functions as a plate holder which holds the quartz plate 2 which is a plate-like member, and the cool plate 62 is cooled by a cooling mechanism which comprises the distribution path 621 and the coolant supplier 68 and functions as the "temperature difference developing section" of the present invention.

Operations of the peeling unit 6 will now be described. The tightly adhered object A is loaded, while supported by the transportation mechanism, into the processing chamber 611 of the peeling unit 6. The object A is formed by the adhering unit 5 and is integration of the substrate 1 and the quartz plate 2 with the insulation film 21 inserted between the two. At this stage, the substrate suction plate 63 has had retracted to above. After placing the tightly adhered object A on the cool plate 62 in such a manner that the quartz plate 2 contacts the cool plate 62, the transportation mechanism retracts outside the processing container 61.

While the cool plate 62 sucks the quartz plate 2, the substrate suction plate 63 which used to retract to above moves downward and sucks the substrate 1 at the back surface (no-thin-film surface) of the substrate 1. Meanwhile, the processing container 61 is closed airtight and the ionizer 69 is activated, the processing chamber 611 is filled with an ozone atmosphere.

Following this, distribution of the coolant to the distribution path 621 of the cool plate 62 is initiated, and the quartz plate 2 is rapidly cooled. As a result, a large temperature difference is created between the insulation film (thin film) 21 and the quartz plate 2, and joining of the quartz plate 2 and the insulation film 21 is released by a difference in thermal expansion coefficient between the quartz plate 2 and the insulation film 21. As the substrate suction plate 63 moves upward after a predetermined period of time, the interface between the quartz plate 2 and the insulation film 21 breaks, the quartz plate 2 is selectively peeled off from the tightly adhered object A without fail, and the insulation film 21 is transferred to the thin film bearing surface 12 of the substrate 1.

The substrate suction plate 63 which has moved to above is now revolved by the revolving mechanism 64 about the axis AX and stops as the thin film bearing surface 12 of the substrate 1 gets directed upward into a horizontal posture. Following this, the substrate suction plate 63 releases suction of the substrate 1 and the vertical movement mechanism 65 then moves the substrate 1 to above. In short, as the pins 67 are raised by the drive members 66, the substrate 1 is raised off from the surface of contact with the substrate suction plate 63.

Figure 7:
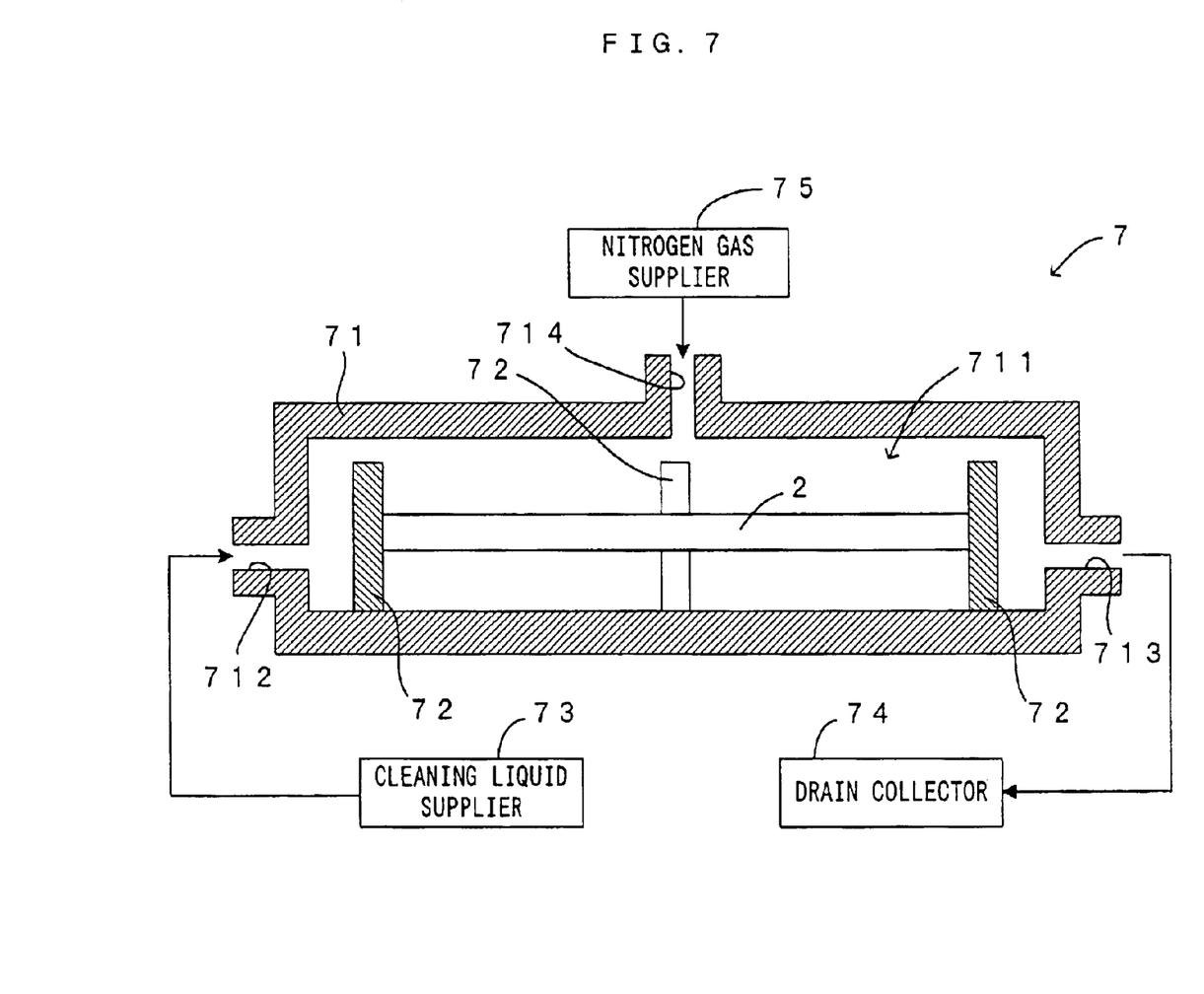
FIG. 7 is a drawing of a preferred embodiment of a cleaning unit which is disposed in the thin film forming apparatus according to the present invention.

The transportation mechanism discharges thus raised substrate 1 and houses the substrate 1 into the substrate cassette. On the other hand, the cool plate 62 releases suction of the quartz plate 2. The transportation mechanism discharges the quartz plate 2 out from the peeling unit 6 and transports the quartz plate 2 to the cleaning unit 7 which is the next processing unit.

While the substrate 1 itself may be destroyed by peeling-induced electrification if the inside of the processing chamber 611 is a vacuum atmosphere during peeling of the quartz plate 2 from the tightly adhered object A, since the inside of the processing chamber 611 is adjusted to an ozone atmosphere in this embodiment, the ionizing effect of ozone obviates electrification and it is therefore possible to effectively prevent destruction of the substrate 1.

FIG. 7 is a drawing of a preferred embodiment of the cleaning unit which is disposed in the thin film forming apparatus according to the present invention. The cleaning unit 7 comprises a processing container 71 whose inside serves as a processing chamber 711 for executing the cleaning process (Step S5). Four support pins 72 are disposed to extend from an inner bottom surface of the cleaning container 71 toward inside the processing chamber 711, so that it is possible to hold and suspend the quartz plate 2 within the processing chamber 711.

A cleaning liquid inlet 712 is formed in a side surface of the cleaning container 71, which makes it possible to supply the cleaning liquid (which may be an organic solvent, such as thinner, isopropyl alcohol and ethanol, pure water, etc.) for cleaning the quartz plate 2 into the processing chamber 711 from a cleaning liquid supplier 73 which is connected to the cleaning liquid inlet 712. A discharge outlet 713 is formed in a side surface of the cleaning container 71 so as to face the cleaning liquid inlet 712. It is therefore possible to discharge the cleaning liquid supplied to the processing chamber 711 in the manner above, a contaminant washed and removed off from the quartz plate 2, etc., from the processing chamber 711 into a drain collector 74. Further, a nitrogen gas inlet 714 is formed in a ceiling central portion of the cleaning container 71, so that it is possible to supply nitrogen gas from the nitrogen gas supplier 75 which is connected to the nitrogen gas inlet 714 into the processing chamber 711 and dry the cleaned quartz plate 2.

Next, in the cleaning unit 7 having such a structure described above, the quartz plate 2 peeled off from the tightly adhered object A by the peeling unit 6 is loaded into the processing chamber 711 and held by the support pins 72. While maintaining this holding stage, an electromagnetic valve (not shown) disposed in the vicinity of the discharge outlet 713 is closed to thereby prohibit drainage through the discharge outlet 713, an electromagnetic valve (not shown) disposed in the vicinity of the nitrogen gas inlet 714 is closed to thereby stop supply of nitrogen gas into the processing chamber 711, and an electromagnetic valve (not shown) disposed in the vicinity of the cleaning liquid inlet 712 is opened to thereby supply the cleaning liquid into the processing chamber 711 and start cleaning the quartz plate 2.

As a cleaning period has elapsed, supply of the cleaning liquid into the processing chamber 711 is stopped, and the cleaning liquid in the processing chamber 711, a contaminant washed and removed off from the quartz plate 2, etc. are discharged from the processing chamber 711 into the drain collector 74. Although drainage is started at the same time with suspension of supply of the cleaning liquid in this embodiment, fresh supply of the cleaning liquid may be continued by continuing supply of the cleaning liquid into the processing chamber 711 and drainage from the processing chamber 711 partially in parallel for a while, and supply of the cleaning liquid may be stopped after continued discharge of the contaminant for a while. In this case, although the quantity of the cleaning liquid to use increases, the cleaning effect improves.

As cleaning of the quartz plate 2 completes in this manner, the electromagnetic valve attached close to the nitrogen gas inlet 714 is opened, nitrogen gas is supplied into the processing chamber 711, and the quartz plate 2 is dried. At this stage, it is more preferable in terms of the efficiency of drying to use nitrogen gas which is heated in advance than to use nitrogen gas which is at an ordinary temperature. In addition, although nitrogen gas is used in this embodiment, the gas to use is not limited to nitrogen gas but may be air, inert gas or the like.

At last, as drying of the quartz plate 2 completes, after the transportation mechanism unloads the quartz plate 2 out from the processing chamber 711, the quartz plate 2 is transported to and housed in the plate-like member cassette and waits within the cassette until reused next time.

In the thin film forming apparatus having such a structure described above, the substrate 1 and the quartz plate 2 are moved closer to each other with the insulation film (thin film) 21 formed on the quartz plate 2 which is non-flexible faced against the thin film bearing surface 12 of the substrate 1, and the insulation film 21 is adhered to the thin film bearing surface 12 within the adhering unit 5. Following this, in the peeling unit 6, the quartz plate 2 is selectively peeled off from the tightly adhered object A, the insulation film 21 is transferred onto the substrate 1 from the quartz plate 2, and the insulation film 21 is disposed on the thin film bearing surface 12 of the substrate 1. Meanwhile, after the quartz plate 2 is cleaned in the cleaning unit 7, the quartz plate 2 is returned to the plate-like member cassette so that the quartz plate 2 can be reused, and hence, it is possible to repeatedly use the quartz plate 2. This largely reduces a running cost than in a conventional apparatus which requires to throw away the sheet film F every time transfer of a thin film is performed.

Further, although the cleaning process (Step S5) described above is not necessary when the insulation film 21 is completely removed from the surface of the quartz plate 2 upon peeling off of the quartz plate 2 from the tightly adhered object A, if the insulation film 21 partially remains on the surface of the quartz plate 2, the quality of the insulation film 21 disposed on the surface of the quartz plate 2 may deteriorate. However, since the quartz plate 2 is cleaned before reused in the apparatus above, it is possible to form the insulation film 21 whose quality is always excellent on the quartz plate 2.

In addition, the non-flexible quartz plate 2 is transported to the adhering unit 5 and the insulation film 21 can be adhered to the substrate 1 in the apparatus above. Hence, it is possible to use a known transportation mechanism such as a transportation robot, and therefore, easily realize automated processing of a thin film.

Further, while quartz is used as the non-flexible plate-like member, other materials such as semiconductor materials, metal, ceramics and resins may be used. Still, considering that quartz does not contain a contaminant which contaminates the substrate 1, can be easily processed and allows easy planarization of the surface of the quartz plate 2, a quartz material is used in the apparatus above.

The present invention is not limited to the preferred embodiment described above but may be modified to the extent not deviating from the intention of the invention. For instance, although the preferred embodiment above requires to use the adhering unit 5 for the adhering process (Step S3) and the peeling unit 6 for the peeling process (Step S4), the adhering process and the peeling process may be carried out continuously in the same unit. For instance, a further cooling mechanism may be disposed to the stage 53 of the adhering unit 5 in addition to the heater 531, and after stopping the heater 531 following the adhering process (Step S3), the peeling process may be executed by this cooling mechanism.

Moreover, while the insulation film 21 is transferred as a thin film onto the thin film bearing surface 12 of the substrate 1 in the preferred embodiment above, the present invention is applicable to thin film forming apparatuses in general in which a thin film other than an insulation film is transferred onto the substrate 1. In addition, although the preferred embodiment above is an example that a thin film is disposed on the substrate 1 which may be a semiconductor wafer, a glass substrate for liquid crystal panel and the like, this is not limiting. The present invention is of course applicable to a glass substrate for photomask, a glass substrate for plasma display, a substrate for optical disk, a wired board (which is a printed board for example) such as a multi-chip module which is used in relation to mounting of electronic components.

Although the invention has been described with reference to specific embodiments, this description is not meant to be construed in a limiting sense. Various modifications of the disclosed embodiment, as well as other embodiments of the present invention, will become apparent to persons skilled in the art upon reference to the description of the invention. It is therefore contemplated that the appended claims will cover any such modifications or embodiments as fall within the true scope of the invention.

What is claimed is:

1. A thin film forming apparatus, comprising:
    a non-flexible plate-like member capable of having a thin film formed on a surface thereof;
    adhering means which moves at least one of said plate-like member and a substrate closer toward the other while holding said plate-like member and said substrate in such a manner that a thin film bearing surface of said substrate is faced against a thin film which is formed on a surface of said plate-like member, thereafter tightly adheres said thin film to said thin film bearing surface, and accordingly obtains a tightly adhered object which is integration of said substrate and said plate-like member with said thin film inserted between said substrate and said plate-like member; and
    peeling means which selectively peels said plate-like member off from said tightly adhered object,
    wherein said plate-like member is a quartz plate.

2. The thin film forming apparatus of claim 1, wherein said peeling means comprises a temperature difference developing section which provides a temperature difference between said thin film and said plate-like member and thereby releases the joining of said thin film and said plate-like member.

3. The thin film forming apparatus of claim 2, wherein said peeling means further comprises a plate holder which holds said plate-like member, and said temperature difference developing section is formed by a cooling mechanism which cools said plate holder.

4. A thin film forming apparatus, comprising:

adhering means which moves at least one of a non-flexible plate-like member and a substrate closer toward the other while holding said plate-like member and said substrate in such a manner that a thin film bearing surface of said substrate is faced against a thin film which is formed on a surface of said plate-like member, thereafter tightly adheres said thin film to said thin film bearing surface, and accordingly obtains a tightly adhered object which is integration of said substrate and said plate-like member with said thin film inserted between said substrate and said plate-like member; and peeling means which selectively peels said plate-like member off from said tightly adhere object, wherein said peeling means comprises a processing container whose inside serves as a processing chamber for peeling said plate-like member off from said tightly adhered object, and an ionizer which develops an ozone atmosphere inside said processing chamber.

5. A thin film forming apparatus, comprising:

adhering means which moves at least one of a non-flexible plate-like member and a substrate closer toward the other while holding said plate-like member and said substrate in such a manner that a thin film bearing surface of said substrate is faced against a thin film which is formed on a surface of said plate-like member, thereafter tightly adheres said thin film to said thin film bearing surface, and accordingly obtains a tightly adhered object which is integration of said substrate and said plate-like member with said thin film inserted between said substrate and said plate-like member;

peeling means which selectively peels said plate-like member off from said tightly adhered object; and cleaning means which cleans said plate-like member which is peeled off by said peeling means.

6. The thin film forming apparatus of claim 5, wherein said cleaning means comprises: a processing container whose inside serves as a processing chamber for cleaning said plate-like member; a plate holder which holds said plate-like member within the processing chamber; and a cleaning liquid supplier which supplies cleaning liquid for cleaning said plate-like member into said processing chamber.

7. The thin film forming apparatus of claim 6, wherein said plate holder holds and suspends said plate-like member within said processing chamber.

8. The thin film forming apparatus of claim 6, wherein said cleaning means further comprises a gas supplier which supplies gas for drying said plate-like member into said processing chamber.

9. The thin film forming apparatus of claim 8, wherein the drying gas is heated in advance.

10. A thin film forming apparatus, comprising:

a coating unit which supplies a coating liquid onto a plate-like member which is non-flexible, to thereby form a thin film onto said plate-like member;

an adhering unit which moves at least one of a plate-like member and a substrate closer toward the other while holding said substrate in such a manner that a thin film bearing surface of said substrate is directed toward a thin film which comes into existence on a surface of said plate-like member as said coating liquid becomes said thin film, thereafter tightly adheres said thin film to said thin film bearing surface, and accordingly obtains a tightly adhered object which is integration of said substrate and said plate-like member with said thin film inserted between said substrate and said plate-like member;

peeling means which selectively peels said plate-like member off from said tightly adhered object;

a cleaning unit which cleans said plate-like member; and a transportation mechanism which transports said plate-like member, said substrate and said tightly adhered object among said coating unit, said adhering unit, said peeling unit and said cleaning unit.

* * * * *